Oct. 12, 1965    R. L. WALKER ETAL    3,210,932
SOLID FUEL REACTION MOTOR
Filed July 8, 1963
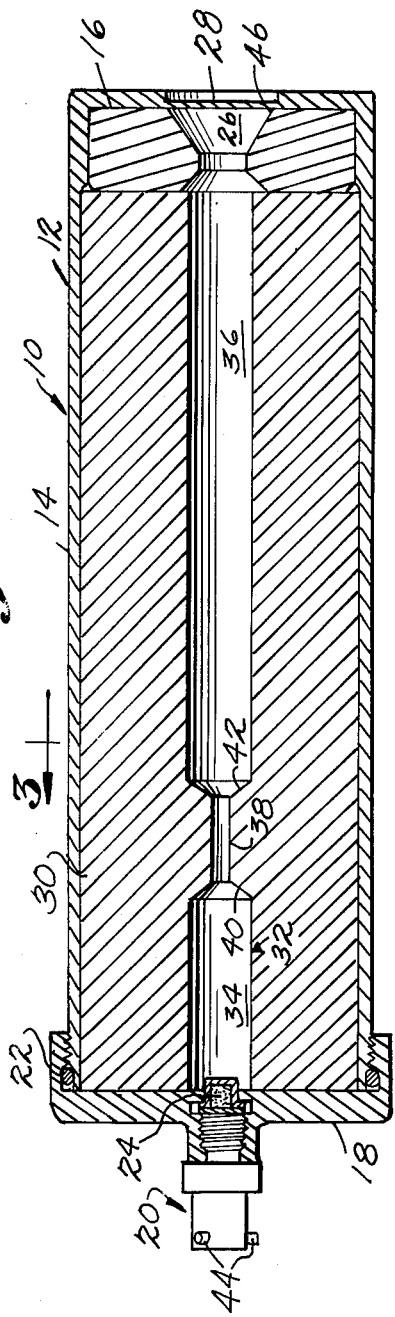
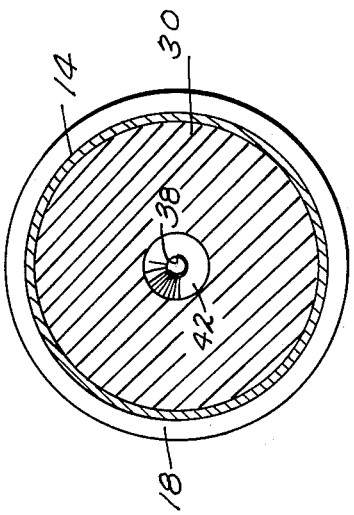
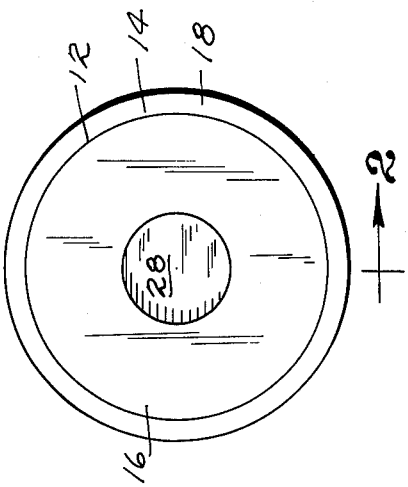
INVENTORS
ROBERT L. WALKER
WILLIAM E. HALLAS
BY Cushman, Darby & Cushman
ATTORNEYS

United States Patent Office 3,210,932
Patented Oct. 12, 1965

3,210,932
SOLID FUEL REACTION MOTOR
Robert L. Walker and William E. Hallas, Scottsdale, Ariz., assignors to Rocket Power, Inc., Mesa, Ariz., a corporation of Arizona
Filed July 8, 1963, Ser. No. 293,494
10 Claims. (Cl. 60—35.6)

This invention relates to a reaction motor and more particularly to an initially hermetically sealed solid propellant rocket motor having integrated anti-misfire features.

Although the invention is particularly adapted to miniature reaction motors of the type used as missile sustainers, gas generators, boosters and the like, the invention may also be profitably employed in association with somewhat larger reaction motors.

Solid propellant rocket motors generally comprise a cylindrical casing having a forward end closure and a rearwardly directed nozzle which between them define a combustion chamber that is usually charged with a rocket grain having one or more axially extending passages therethrough. Some means such as a squib is usually provided to ignite the rocket grain. The ignited grain produces a continuous explosion of high temperature gases which proceed outwardly of the nozzle.

Where a motor of this variety is to be stored for an indeterminate period of time prior to its use it is necessary to insure the stability of the rocket grain against environmental attack, as by moisture or the like. Additionally, most commonly employed rocket grains burn more rapidly, and thus produce a greater amount of thrust, at higher temperatures and pressures. For these and other reasons it has been found desirable to provide a closure for the nozzle end of this type of rocket motor that will remain in place during storage and until a short period of time after the ignition of the motor.

Prior art attempts at providing a temporary closure of this variety have not proved entirely successful because of one or more shortcomings inherent in their organization. Firstly, where they have entailed addition of one or more separate components to the motor structure the resultant cost and complication of the system has reduced the scope of their use. Secondly, where they are positioned so that they must be melted away by the hot expanding gases, the instantaneous profile of the orifice through any particular closure is difficult to predict and this lack of uniformity has reduced the potential scope of use of this variety of closure.

More importantly, a great disadvantage of many prior art temporary closures is that the sudden reduction of the pressure and temperature within the burning area that results from the melting or rupture of the closure often causes an extinguishing of the flame within the combustion chamber, and therefore a misfire.

It is therefore an object of this invention to provide an initially hermetically sealed solid fuel reaction motor which includes a shearable temporary closure for the nozzle end of the motor.

It is another object of this invention to provide a device of the type described in which the temporary closure disk is an integrally formed part of the rocket casing.

It is a further object of the invention to provide a device of the type described in which the closure shears to a uniform size upon the buildup of sufficient pressure within the motor cavity.

An important object of this invention is the provision of a device of the type described in which extinguishing of the combustion of the rocket grain upon rupturing of the temporary closure is effectively prevented.

Another object of the present invention is to provide a device of the type described in which a choke having a reduced diameter opening is provided in the rocket grain intermediate the ends of the motor.

Yet another object of the invention is to provide a device of the character described in which the motor cavity and the choke are configured so that the velocity of rocket gases through the choke is substantially sonic at the time the closure ruptures whereby the wave caused by the sudden reduction in pressure at the nozzle is effectively precluded from propagating upstream to the burning area beyond the choke.

These and other objects of this invention should become more clearly apparent during the course of the following detailed explanation in which specific reference is made to the embodiment shown in the attached drawings. It should be realized, however that the embodiment shown is merely illustrative and should not be understood as limiting the scope of the invention in any manner.

In the drawing:

FIGURE 1 is a longitudinal sectional view of a reaction motor employing the principles of this invention.

FIGURE 2 is an end view of the reaction motor especially illustrating the shearable temporary closure.

FIGURE 3 is a cross sectional view taken substantially along the line 3—3 of FIGURE 1 and particularly illustrating the choke.

Now with more particular reference to the drawing a miniature solid fuel type reaction motor is illustrated at 10 in FIGURE 1. The motor 10 includes a novel casing 12 having an elongated hollow cylindrical peripheral wall 14 which is integrally formed with a disk-like end wall 16. Preferably the casing 12 is formed from metallic material by conventional techniques such as deep drawing or casting although it is contemplated that other methods and materials such as moldable plastics could be advantageously employed under some circumstances.

As shown the end of the peripheral wall 14 opposite the end wall 16 is exteriorly threaded to receive a closure 18 which carries a conventional squib assembly 20 axially thereof. Suitable sealing means such as an O-ring 22 can be provided between the peripheral wall 14 and the end closure 18. Preferably the squib 20 is of the electrically actuatable type and may, depending on the requirements of the rocket grain used, be augmented by a capsule of ignition powder 24 to create sufficient heat to ignite the rocket grain.

The rocket nozzle 26 is preferably in the form of a massive annular member positioned coaxially within the casing adjacent the inner surface of the end wall 16. The thickness of the peripheral and end walls is generally somewhat greater where they contact the nozzle 26 to impart strength and sufficient dimensional rigidity to the structure, however the end wall 16 is relieved at its center by machining or otherwise to form a relatively thin diaphragm 28 for purposes that will be elucidated more fully hereinafter.

A charge of rocket grain 30 that has been compacted, molded or otherwise formed is located within the casing 12 as to extend between the end closure 18 and the end wall 16. The rocket grain 30 has a continuous opening 32 longitudinally therethrough as best shown in FIGURE 1. The opening 32 comprises a pyrogen cavity 34 of a first diameter extending between the end of the grain nearest the squib 20 and a point intermediate the ends of the grain 30; a main motor cavity 36 of preferably, but not essentially, the same diameter as the pyrogen cavity which extends between the rocket nozzle 26 and a point intermediate the ends of the grain; and a choke 38 having a substantially smaller diameter than either the pyrogen cavity or the main motor cavity. The choke 38 is located between and interconnects the two just mentioned cavities. The inner peripheral surfaces of the grain may be frusto-conically contoured as at 40 and 42 so that there is a smooth transistion between each cavity and the choke.

In operation of the reaction motor 10, the squib 20 is activated as by applying an electrical current to the terminals 44 causing the ignition of the capsule 24. The high temperature burning gas created thereby ignites the rocket grain immediately surrounding the pyrogen cavity 34. Almost immediately a large volume of high temperature gases are created by the ignition of the pyrogen section and these gases exhaust through the choke 38 to the main motor cavity 36 and ignite the grain in that area. Upon the increase of pressure in the main motor cavity to a predetermined value, the thin section or temporary closure 28 shears cleanly away and the gases begin to exhaust through the nozzle 26. As shown the diameter of the closure 28 is such that it is preferably at least equal to that of the outer end 46 of the nozzle orifice. For this reason the opening created by the shearing of the closure 28 in no way interferes with the exhausting of gases through the orifice.

According to the invention the size of the choke is made such that the burning gases traveling therethrough from the pyrogen cavity at the time of the closure shear-off will be traveling sonicly so that even though the sudden pressure drop at shear-off may extinguish the flame in the main motor cavity, this pressure wave cannot travel up stream through the choke to extinguish the flame in the pyrogen cavity. The hot gases exhausting from the pyrogen cavity, through the choke to the motor cavity quickly reestablish the flame in this last mentioned portion after the closure shear-off. Preferably the whole sequence mentioned up until now takes place within a very short period of time, for instance less than 0.03 second and the choke 38 is designed so that none of the rocket grain which defines it will remain when the rocket motor burns out.

As discussed above the temporary closure 28 is designed to shear cleanly along its outer periphery from the casing end upon an application of a predetermined pressure from the interior of the motor. Upon shear-off the closure 28 is blown away and causes absolutely no deviation in the exhaust gas direction. As best illustrated in FIGURE 1, the closure 28 is of such a diameter that upon its removal the exhaust gases are immediately expelled through the calculated nozzle diameter unimpeded by the remaining smooth periphery of the opening through the end wall 16 and the thrust alignment is perfectly preserved.

Generally, the diaphragm 28 dimensions are calculated on the basis of a flat plate having a fixed outer periphery according to the formula:

$$(1) \quad \sigma = K \frac{3w(m+1)}{8\pi m t^2}$$

wherein $\sigma$ = the yield stress of material
$w$ = the total load on the diaphragm at the desired shear point
$m$ = the reciprocal of Poisson's ratio
$t$ = the thickness of the diaphragm
$K$ = an empirical constant determined by actual hydrostatic test on diaphragms of various sized motor casings.

Preferably the initial pyrogen cavity surface area capable for burning and the diameter of the choke are determined using the relation:

$$(2) \quad P_c = \frac{W_p C^*}{g A_T}$$

wherein $P_c$ = the known necessary pressure in the motor cavity to insure ignition of the rocket grain after the temporary closure has sheared and the gases are exhausting through the nozzle;

$W_p/g$ = the mass flow rate of propellant burning (divided by the gravitational constant);
$C^*$ = the characteristic velocity of the particular propellant (in length/time, an empirical constant) to solve for $W_p/g$ and the relation:

$$(3) \quad W_p = r_B A_B P_p$$

wherein $W_p$ = the weight flow rate of propellant burning as determined by Equation 2
$r_B$ = the burning rate of the propellant (in length/time, using assumed values)
$A_B$ = the total burning area
$P_p$ = the density of the rocket grain, to solve for $A_B$ From the choosen motor cavity area, $A_T$ and the calculated burning area, $A_B$ the necessary pyrogen cavity area can be easily found by difference and from the mass flow rate calculated and the density of the gas just after the shearing of the closure, the diameter of the choke necessary to impose sonic velocity on the gas issuing from the pyrogen cavity can easily be calculated.

It can thus be seen that the choke of the invention provides a "rocket within a rocket" in that the velocity of the exhaust through choke is greater than the velocity of the exhaust through the rocket nozzle for a finite period of time after the shear-off of the temporary closure.

Although the pyrogen and motor cavities, the choke passage and the nozzle orifice have been illustrated as being generally cylindrical it is clear that they may take any shape conventional to solid rocket fuel combustion chambers and nozzle orifices.

It should be realized that the unitary construction of the end wall 16 and temporary closure 28 as integral portions of the casing 12 greatly add to the reliability and economy of the novel motor. Additionally this system provides effective means for temporarily hermetically sealing the rocket grain within the casing and confining the initial exhaust gases until sufficient pressure has built up within the combustion area.

Although a preferred embodiment has been illustrated and fully explained it should be understood that many modifications, including increasing and decreasing the relative size of various components, may be employed even so far as to nearly eliminate the motor cavity in very small motors and rely on the initial smallness of size of the choke with respect to the nozzle to prevent upstream propagation of the expansion wave at the time of the closure shear-off. Accordingly, the extent of the invention as embodied in its principles should not be limited by the particular illustrations outlined but be limited only by the spirit and scope of the following claims.

We claim:
1. A solid fuel reaction motor comprising a casing including an elongated hollow peripheral wall and a first end closure; a nozzle having an orifice therethrough mounted within the casing closely adjacent the first end closure; a second end closure secured to said casing as to define a solid fuel receiving chamber within the casing between the nozzle and the second end closure; fuel igniting means carried by the second end closure and communicating with the chamber; a charge of solid fuel positioned within the casing between the nozzle and the second end; a first relatively broad pyrogen cavity in said fuel communicating with the igniting means; a second relatively broad motor cavity in said fuel communicating with the nozzle, a relatively narrow choke positioned between and communicating said first and second cavities; and a diaphragm arranged in said first end closure to shear cleanly away from the closure upon the building up of a predetermined pressure due to combustion gases within the chamber after the ignition of said fuel.

2. A solid fuel reaction motor as set forth in claim 1 wherein the first end closure and diaphragm comprise integral portions of the casing and the solid fuel is initially hermetically sealed within the chamber defined by the second end closure with the casing until the shearing of the diaphragm.

3. A solid fuel reaction motor as set forth in claim 2 having a diaphragm whose thickness $t$ is defined by the relation $$\sigma = K \frac{3w(m+1)}{8\pi m t^2}$$

wherein $\sigma$ = the yield stress of the diaphragm material;
$w$ = the total load on the diaphragm at the moment of shearing;
$m$ = the reciprocal of Poisson's ratio;
$K$ = an empirical constant dependant on the actual dimensions employed 4. A solid fuel reaction motor as set forth in claim 2 wherein the solid fuel is a monolithic unit and the choke is defined in the fuel between the two cavities.

5. A solid fuel reaction motor as set forth in claim 2 wherein the choke diameter is substantially less than the nozzle orifice diameter and the ignition means is arranged to initially ignite the fuel peripherally surrounding the pyrogen cavity whereby gases created by the combustion of fuel in the pyrogen cavity pass through the choke, pressurize the motor cavity, pass through the nozzle orifice and shear the diaphragm, the velocity of the gases passing through the choke being so much greater than the velocity of gases passing through the nozzle orifice that the expansion wave created by the sudden reduction in motor cavity pressure upon the shearing off of the diaphragm is effectively precluded from propagating upstream through the choke to extinguish the combustion in the pyrogen cavity.

6. A solid fuel reaction motor as set forth in claim 5 wherein the diameter of the choke is of such size that the velocity of gases passing through the choke immediately subsequent to the shearing of the diaphragm is sonic.

7. A solid fuel reaction motor as set forth in claim 5 wherein the igniting means comprises an electrically actuatable squib.

8. A solid fuel reaction motor as set forth in claim 7 additionally comprising an igniting charge capsule interposed between the squib and the solid fuel charge.

9. A solid fuel reaction motor as set forth in claim 5 wherein the diameter of the shearable diaphragm is at least as large as the nozzle orifice and the diaphragm is arranged to shear cleanly away from the first end closure leaving a smooth opening therethrough at least as wide as the nozzle orifice.

10. A solid fuel reaction motor as set forth in claim 1 wherein the pyrogen cavity, the motor cavity and the interconnecting choke are all generally cylindrical and mutually coaxial with each other, the solid fuel charge, the casing, the nozzle orifice and the diaphragm.

No references cited.

MARK NEWMAN, *Primary Examiner.*

SAMUEL LEVINE, *Examiner.*